(12) United States Patent
Zlotnick

(10) Patent No.: US 6,640,009 B2
(45) Date of Patent: Oct. 28, 2003

(54) IDENTIFICATION, SEPARATION AND COMPRESSION OF MULTIPLE FORMS WITH MUTANTS

(75) Inventor: Aviad Zlotnick, Mitze Netofa (IL)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 09/777,792

(22) Filed: Feb. 6, 2001

(65) Prior Publication Data

US 2002/0106128 A1 Aug. 8, 2002

(51) Int. Cl.⁷ .............................. G06K 9/34; G06K 9/64; G06K 9/62; H04N 1/00; G06F 15/00
(52) U.S. Cl. ..................... 382/224; 382/176; 382/180; 382/217; 382/225; 382/305; 382/306; 358/403; 715/506; 715/505; 715/507
(58) Field of Search ................................ 382/100–102, 382/151, 159, 163, 170, 172–173, 175–176, 180–181, 190, 209, 215, 217–219, 224–225, 227, 232, 287, 289, 294, 305, 306, 177, 192, 202, 282; 358/1.14, 403, 406, 450, 452–453; 707/2; 715/505, 507, 530, 506, 508, 509, 511, 517

(56) References Cited

U.S. PATENT DOCUMENTS

| | | | | |
|---|---|---|---|---|
| 3,851,308 A | * | 11/1974 | Kawasaki et al. | 382/210 |
| 4,955,060 A | * | 9/1990 | Katsuki et al. | 382/212 |
| 5,182,656 A | | 1/1993 | Chevion et al. | 358/452 |
| 5,191,525 A | | 3/1993 | LeBrun et al. | 364/419 |
| 5,247,591 A | * | 9/1993 | Baran | 382/179 |
| 5,394,487 A | * | 2/1995 | Burger et al. | 382/209 |
| 5,434,933 A | | 7/1995 | Karnin et al. | 382/317 |
| 5,631,984 A | | 5/1997 | Graf et al. | 382/317 |
| 5,719,960 A | * | 2/1998 | Melen | 382/209 |
| 5,742,879 A | * | 4/1998 | Altrieth, III | 399/139 |
| 5,793,887 A | | 8/1998 | Zlotnick | 382/209 |
| 5,832,476 A | * | 11/1998 | Tada et al. | 707/2 |
| 5,845,302 A | * | 12/1998 | Cyman, Jr. et al. | 707/517 |
| 5,864,855 A | * | 1/1999 | Ruocco et al. | 707/10 |
| 6,020,972 A | | 2/2000 | Mahoney et al. | 358/1.14 |
| 6,061,694 A | * | 5/2000 | Janay et al. | 707/507 |
| 6,125,362 A | * | 9/2000 | Elworthy | 707/6 |
| 6,151,422 A | * | 11/2000 | Hayduchok et al. | 382/286 |
| 6,457,028 B1 | * | 9/2002 | Pitkow et al. | 707/513 |

OTHER PUBLICATIONS a publication to Yu, et al. "A generic System for form Dropout", IEEE, pp. 1127–1134, 1996.*
Waked, et al "Skew segmentation, page segmentation, and script classification of printed document images", IEEE, 4470–4475, Jan. 1998.*

* cited by examiner

Primary Examiner—Daniel G. Mariam
(74) Attorney, Agent, or Firm—Darby & Darby

(57) ABSTRACT

A method for processing images includes receiving a group of the images having similar characteristics, the group comprising multiple classes, such that each image belongs to one of the classes and comprises a fixed portion common to all of the images in the class to which it belongs, and a variable portion, which distinguishes the image from the other images in the class. A reference area is found in the images, in which the fixed portion of the images in a first one of the classes differs consistently from the fixed portion of the images in a second one of the classes. The images are sorted into the classes based on the reference area.

34 Claims, 6 Drawing Sheets

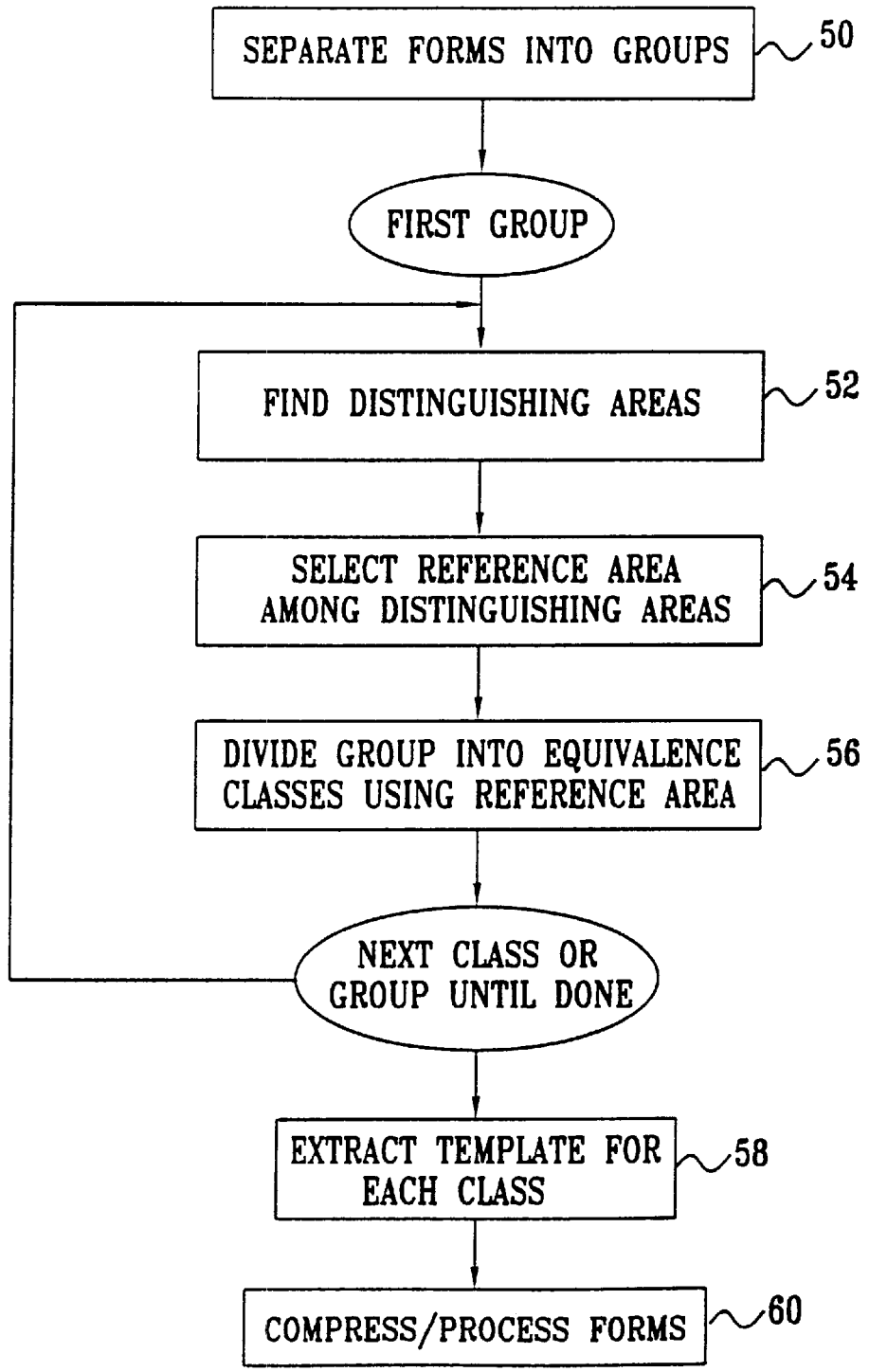

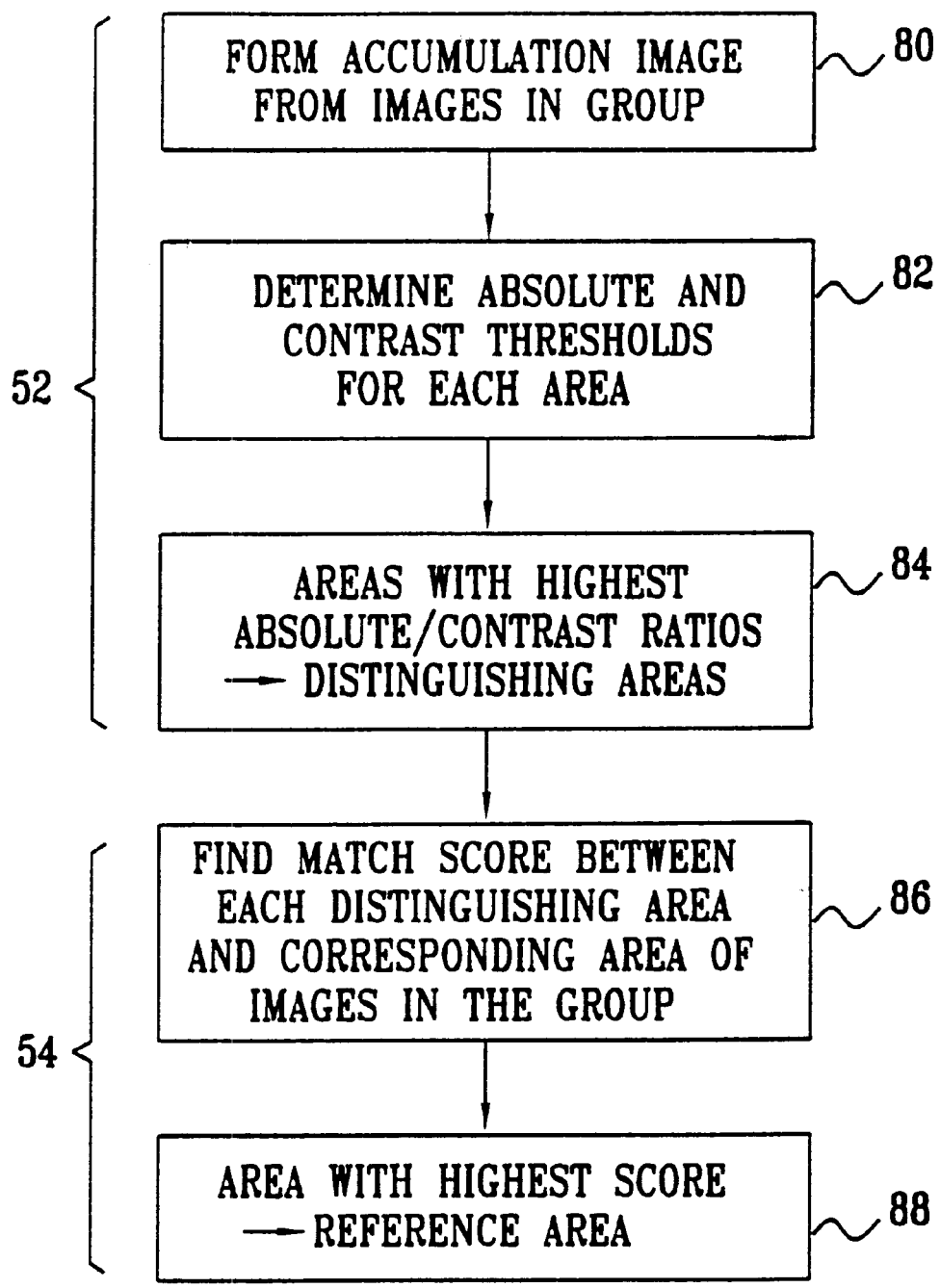

IDENTIFICATION, SEPARATION AND COMPRESSION OF MULTIPLE FORMS WITH MUTANTS

FIELD OF THE INVENTION

The present invention relates generally to document image processing, and specifically to methods for recognition of preprinted form documents and extraction of information that is filled into them.

BACKGROUND OF THE INVENTION

In many document imaging systems, large numbers of forms are scanned into a computer, which then processes the resultant document images to extract pertinent information. Typically, the forms comprise preprinted templates, containing fields that have been filled in by hand or with machine-printed characters. To extract the information that has been filled in, the computer must first identify the template. Various methods of image analysis are known in the art for these purposes. One such method is described in U.S. Pat. No. 5,434,933, whose disclosure is incorporated herein by reference.

In order to precisely identify the location of fields in the template, a common technique is for the computer to register each document image with a reference image of the template. Once the template is registered, it can be dropped from the document image, leaving only the handwritten or printed characters in their appropriate locations on the page. For example, U.S. Pat. Nos. 5,182,656, 5,191,525, 5,793,887, and 5,631,984, whose disclosures are incorporated herein by reference, describe methods for registering a document image with a form template so as to extract the filled-in information from the form. After drop-out of the template, the characters remaining in the image are typically processed using optical character recognition (OCR) or other techniques known in the art. Dropping the template from the document image is also crucial in compressing the image, reducing substantially the volume of memory required to store the image and the bandwidth required to transmit it. For example, U.S. Pat. No. 6,020,972, whose disclosure is incorporated herein by reference, as well as the above-mentioned U.S. Pat. No. 5,182,656, describe methods for compressing document images based on template identification. The template itself need be stored and/or transmitted only once for an entire group of images of filled-in forms.

Methods of template registration and drop-out that are known in the art generally require the template to be known before compression or other processing can take place. The computer must be informed of the template type or be able to select the template from a collection of templates that are known in advance. In other words, the computer must have on hand the appropriate empty template for every form type that it processes. However, it frequently happens that not all templates or template variations are known at start-up. Furthermore, experience shows that in most systems, there is not a single template for all form types, but rather several, and that unexpected template variations may occur that cannot be distinguished by any combination of the global features that are currently used for form recognition. In the context of the present patent application and in the claims, such template variants are referred to as "mutants."

Thus, in form processing systems known in the art, it is generally not possible to use template drop-out in the presence of such mutants, without costly involvement by a human operator in identifying the template to use for each form.

SUMMARY OF THE INVENTION

In preferred embodiments of the present invention, a document image processing system receives images of filled-in forms, at least some of which are based on templates that are not known in advance. The system automatically aligns and sorts these images into groups having similar template features, using any suitable method known in the art. Each such group, however, may contain multiple mutant templates, differing in one or more of their features. The present invention provides novel methods for recognizing these mutants and sorting the images in each group accordingly into precise sub-groups, or classes, each with its own mutant template. Preferably, the mutant template in each class is then extracted and dropped out of the images, thus enabling optimal image compression and other subsequent processing.

In order to distinguish the mutants in a given group one from another, the system preferably generates a gray-scale accumulation image by combining the images in the group. This accumulation image is then analyzed in order to distinguish areas that belong to the template common to all of the images from areas in which variations occur from image to image. These variations are further analyzed to determine, in each area, whether they are due to mutations of the template or to content filled into the individual forms. When it is determined that the variation in a given area is due to template mutation, the images in the group are sorted into mutant sub-groups according to their content in this area, which is referred to herein as a reference area. Typically, a sub-group created by sorting the original group on one reference area may then be subdivided into smaller sub-groups by sorting it on another reference area. This sorting process preferably continues until substantially all of the images have been divided into mutant sub-groups, each having its own template that is common to all of the images in the sub-group.

Preferably, after the sorting is completed, the respective template for each sub-group is extracted from one of the images and is dropped out of all of the images in the sub-group. The images are then automatically processed by compression, OCR and/or other document processing methods known in the art. Preferably, the extracted template is stored in a library for use in processing subsequent forms. The ability provided by preferred embodiments of the present invention to recognize and sort all mutants allows the images to be processed efficiently, reducing both the required storage volume and the costs of manual processing in dealing with large numbers of forms.

Although the preferred embodiments described herein relate to processing of images of form documents, the principles of the present invention may similarly be applied in extracting information from groups of images of other types, in which the images in a group contain a common, substantially fixed part along with individual, variable parts.

There is therefore provided, in accordance with a preferred embodiment of the present invention, a method for processing images, including:

receiving a group of the images having similar characteristics, the group including multiple classes, such that each image belongs to one of the classes and includes a fixed portion common to all of the images in the class to which it belongs, and a variable portion, which distinguishes the image from the other images in the class;

finding a reference area in the images, in which the fixed portion of the images in a first one of the classes differs consistently from the fixed portion of the images in a second one of the classes; and sorting the images into the classes based on the reference area.

Preferably, receiving the group of the images includes processing the images to determine the characteristics thereof, and selecting the images for inclusion in the group by finding a similarity in the characteristics.

Further preferably, the characteristics include image features recognizable by a computer, and receiving the group of the images includes mutually aligning the images in the group responsive to the features. In a preferred embodiment, the images include images of form documents, and the fixed portion of the images includes form templates, and wherein the features include features of the templates.

Preferably, finding the reference area includes:

classifying a plurality of areas of the images into areas of a first type, in which substantially all of the images in the group are substantially the same, a second type, in which a sub-group of the images in the group, but not all of the images in the group, are substantially the same, and a third type, in which substantially all of the images in the group are different; and choosing one of the areas of the second type to use as the reference area.

Further preferably, classifying the plurality of the areas includes combining the images in the group to generate an accumulation image, and analyzing the accumulation image to find the areas of the second type. Most preferably, analyzing the accumulation image includes calculating, for each of the areas in the accumulation image, an absolute threshold, indicative of a difference between bright and dark parts of the area, and a contrast threshold, indicative of a minimum significant difference between neighboring pixels in the area, and identifying as areas of the second type the areas that have a high ratio of the absolute threshold to the contrast threshold, relative to other areas of the accumulation image. Additionally or alternatively, choosing the area of the second type to use as the reference area includes generating a match score for each of the areas in the accumulation image by comparing the areas to corresponding areas in the images in the group, and selecting the one of the areas having the highest match score.

Further additionally or alternatively, sorting the images includes selecting one of the images in the sub-group as a base image and removing from the sub-group the images in the group that differ in the reference area from the base image, and repeating over the images in the sub-group the steps of classifying the plurality of the areas and choosing one of the areas of the second type so as to find a new reference area, and sorting the images in the sub-group based on the new reference area. Preferably, the steps of classifying the plurality of the areas, choosing one of the areas of the second type, and removing the images from the sub-group are repeated until substantially no remaining areas of the second type are found in the sub-group of the sorted images.

In a preferred embodiment, the images include images of form documents, and the fixed portion includes a form template, and the areas of the second type include areas in which the template of the images in the sub-group differs from the template of the images that are not in the sub-group.

Preferably, finding the reference area includes finding a first reference area so as to separate a first sub-group of the images, containing the first one of the classes, from a second sub-group of the images, containing the second one of the classes, based on the first reference area, and sorting the images includes finding a further reference area in the images of the first sub-group, and sorting the images in the first sub-group based on the further reference area.

In a preferred embodiment, the images include images of form documents, and the fixed portion includes a form template, and the variable portion includes characters filled into the template, and sorting the images includes grouping the documents such that all of the documents in each of the classes have substantially the same template. Preferably, the method includes extracting the template from the images in one of the classes by finding a substantially invariant portion of the images in the class. Additionally or alternatively, the method includes processing the images so as to remove the template therefrom, while leaving the filled-in characters in the images.

Further additionally or alternatively, the method includes removing the fixed portion from the images in the first one of the classes after sorting the images, and compressing the variable portion of each of the images that remains after removal of the fixed portion.

There is also provided, in accordance with a preferred embodiment of the present invention, apparatus for processing images, including an image processor, which is arranged to receive a group of the images having similar characteristics, the group including multiple classes, such that each image belongs to one of the classes and includes a fixed portion common to all of the images in the class to which it belongs, and a variable portion, which distinguishes the image from the other images in the class, and to find a reference area in the images, in which the fixed portion of the images in a first one of the classes differs consistently from the fixed portion of the images in a second one of the classes, and to sort the images into the classes based on the reference area.

There is additionally provided, in accordance with a preferred embodiment of the present invention, a computer software product, including a computer-readable medium in which program instructions are stored, which instructions, when read by a computer, cause the computer to receive a group of images having similar characteristics, the group including multiple classes, such that each image belongs to one of the classes and includes a fixed portion common to all of the images in the class to which it belongs, and a variable portion, which distinguishes the image from the other images in the class, and to find a reference area in the images, in which the fixed portion of the images in a first one of the classes differs consistently from the fixed portion of the images in a second one of the classes, and to sort the images into the classes based on the reference area.

The present invention will be more fully understood from the following detailed description of the preferred embodiments thereof, taken together with the drawings in which:

BRIEF DESCRIPTION OF THE DRAWINGS

FIG. 3 is a flow chart that schematically illustrates a method for processing document images, in accordance with a preferred embodiment of the present invention;

FIG. 5 is a flow chart that schematically illustrates a method for identifying reference areas for use in sorting a group of form document images, in accordance with a preferred embodiment of the present invention.

DETAILED DESCRIPTION OF PREFERRED EMBODIMENTS

Figure 1:
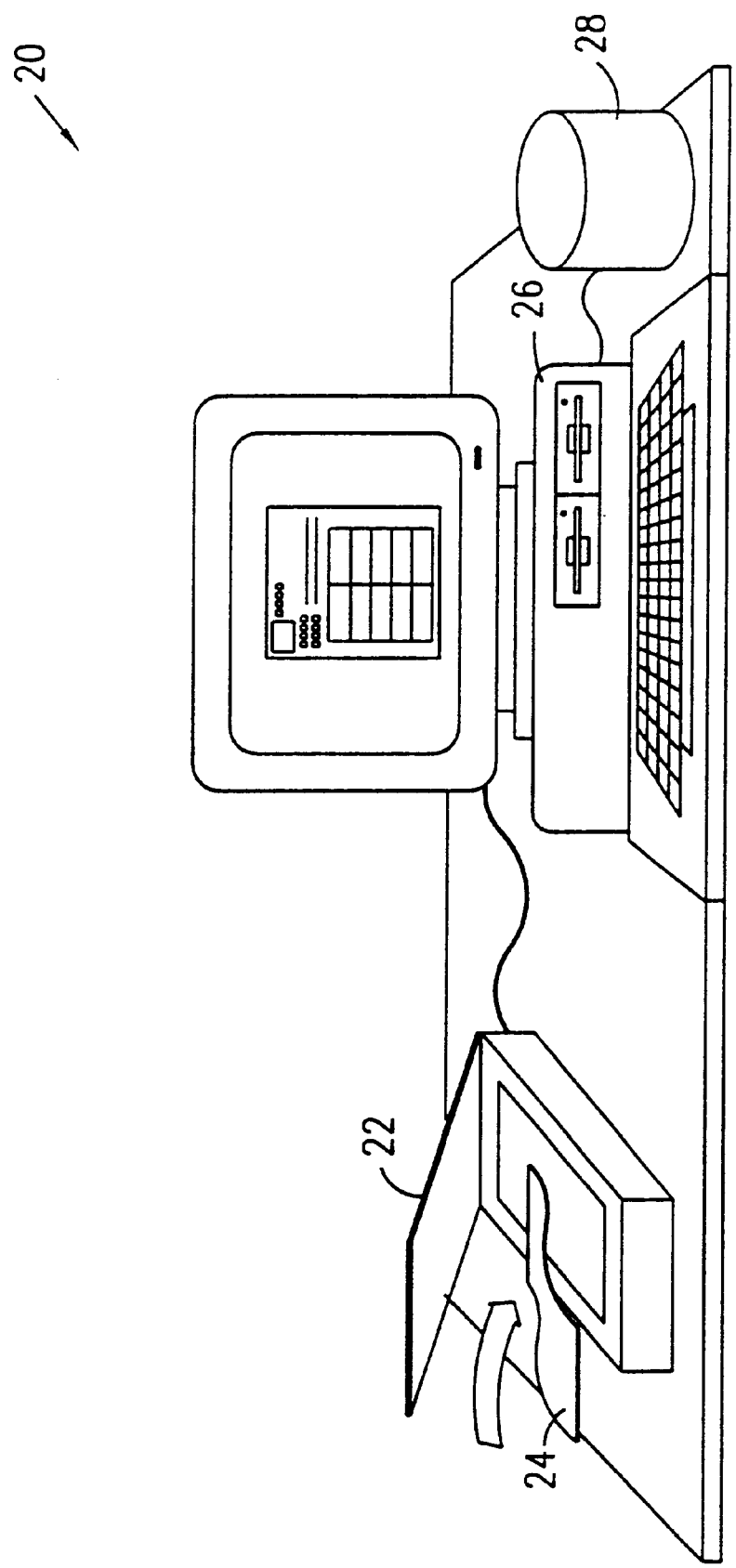
FIG. 1 is a schematic, pictorial illustration of a system for document image processing, in accordance with a preferred embodiment of the present invention.

FIG. 1 is a schematic, pictorial illustration or a system 20 for processing of form document images, in accordance with a preferred embodiment of the present invention. System 20 comprises a scanner 22, or any other suitable type of image capture device known in the art, which receives and scans a document 24 comprising a preprinted form, having a template that is typically filled in with handwritten, typed or printed characters. The scanner captures an image of the document and conveys the corresponding image data to a form image processor 26, typically comprising a suitable general-purpose computer. Alternatively, the image is input to the processor from another source.

Processor 26 identifies the template in each image that it receives, and groups the images according to their respective templates. Unlike systems known in the art, processor 26 is able to sort groups of images having similar, but not identical, mutant templates into sub-groups, or classes, according to their templates, using methods described hereinbelow. It then drops the appropriate template out of each image and, typically, compresses the image for storage in a memory 28 and/or performs other document processing functions known in the art.

The methods of image recognition, sorting and compression described hereinbelow are preferably implemented in software running on processor 26. The software may be supplied on tangible media, such as diskettes or CD-ROM, and loaded into the processor. Alternatively, the software may be downloaded to the processor via a network connection or other electronic link. Further alternatively, processor 26 may comprises dedicated, hard-wired elements or a digital signal processor for carrying out some or all of the image processing steps.

Figure 2A:
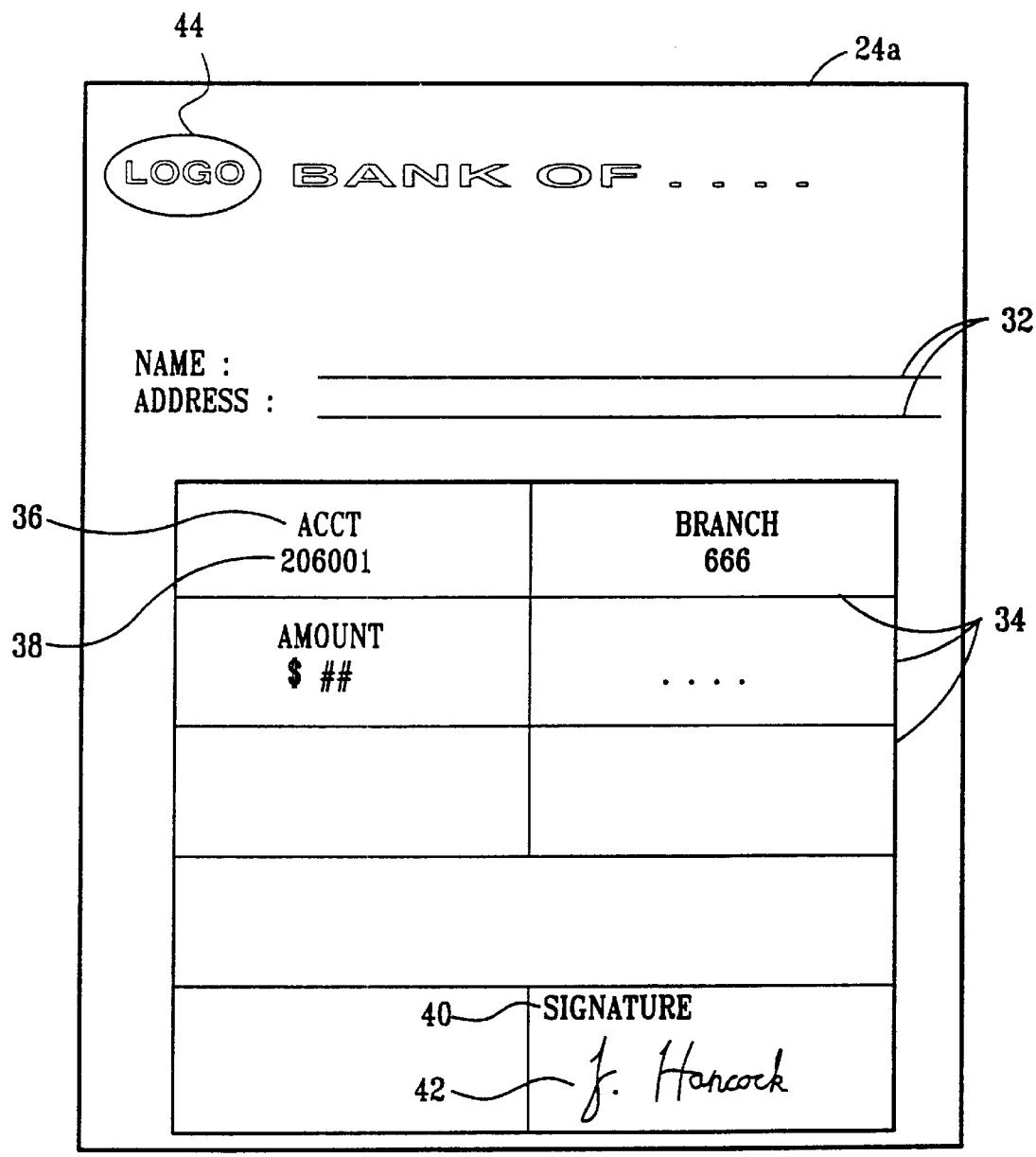
FIGS. 2A and 2B are schematic representations of mutant form documents, used in illustrating a preferred embodiment of the present invention.
Figure 2B:
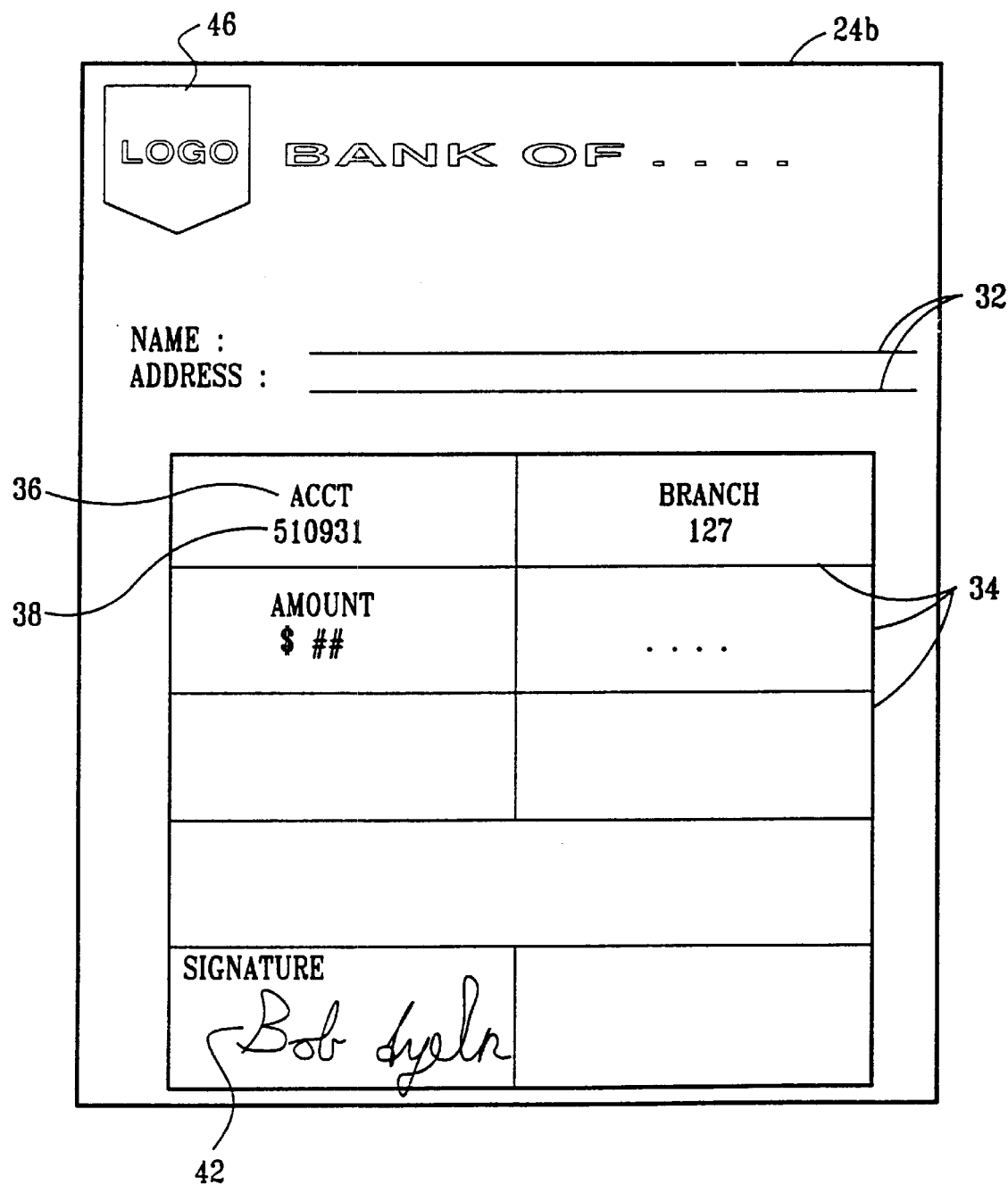

FIGS. 2A and 2B are schematic illustrations of form documents 24a and 24b, respectively, which are useful in understanding preferred embodiments of the present invention described hereinbelow. Documents 24a and 24b are based on mutant templates, which are similar, but not identical. Each form comprises a template made up of elements such as lines 32, boxes 34 and preprinted text 36, as well as other graphics. The lines and boxes define fields, which are filled in by hand or machine, typically with alphanumeric characters, such as fill-in characters 38 shown in the "ACCT" box. The similar template elements of documents 24a and 24b, which are used in template identification methods known in the art, would probably lead processor 26 to identify the documents initially as belonging to the same template group.

On the other hand, documents 24a and 24b differ in their respective logos 44 and 46, as well as in the position of a signature box 40, containing a signature 42. If the forms are incorrectly identified by processor 26 as belonging to a common template, an error may result in extraction of the filled-in information, necessitating costly involvement by a human operator. Incorrect template identification will, at the least, lead to incomplete template drop-out, so that the compressed image of at least one of the documents will require greater storage volume. Furthermore, when the compressed image is reconstructed, it will contain the wrong template, and possible errors may ensue in processing the reconstructed image. In preferred embodiments of the present invention, however, processor 26 is able to distinguish automatically between the templates of documents 24a and 24b.

FIG. 3 is a flow chart that schematically illustrates a method for processing a body of document form images that include mutant templates, in accordance with a preferred embodiment of the present invention. At an initial sorting step 50, processor 26 separates the documents into groups of similar images, using any suitable method known in the art. For example, the processor may extract horizontal and vertical lines from each image, and match the images against one another based on these lines. These matching images would typically be classified by methods known in the art as having the same template. In preferred embodiments of the present invention, they are simply classified as belonging to the same group for further mutant checking and sorting. The images in each group are then mutually aligned for subsequent processing. Details of step 50 are described hereinbelow with reference to FIG. 4.

A detailed analysis of the contents of the images in any given group following step 50 will typically reveal areas in the images of three principal types:

Type 1—areas in which all of the images in the group are practically identical. These are areas belonging to the image templates, in which there are no substantial variations in the template from one image to another.

Type 2—areas in which there are differences among the images in the group due to variations in the image templates within the group. In the example of FIGS. 2A and 2B, the area of logos 44 and 46 would be a Type 2 area.

Type 3—areas in which there are differences as the result of filled-in text.

The purpose of the method steps that follow is to distinguish between these three types of areas. When Type 2 areas are discovered, processor 26 sorts the images into sub-groups, or mutant classes, according to their contents in these areas. This sorting continues, with further sub-division of the sub-groups as required, until each sub-group contains only Type 1 and Type 3 areas, i.e., until substantially all of the Type 2 areas have been eliminated.

To identify the Type 2 areas in the group, processor 26 preferably finds distinguishing areas in the images, at a distinguishing step 52. These are areas whose content, analyzed over the images in the group, would tend to indicate that they are Type 2 areas. One of the distinguishing areas is then chosen as a reference area, at a reference selection step 54. This is typically the distinguishing area that is found to have the largest number of pixels that belong to the form template, rather than filled-in content. It can then be safely assumed that images that match one another in the reference area belong to the same mutant sub-group, while those that do not match should belong to one or more other sub-groups. A preferred method for finding the distinguishing areas and selecting reference areas is described hereinbelow with reference to FIG. 5.

Based on the selected reference area, the images in the group are divided into sub-groups, at a fine sorting step 56. Preferably, the reference area in one of the images is chosen as a base, and the corresponding areas in all of the other images are compared to it. All images that match the base to within a chosen threshold are considered to be equivalent and are sorted into the same sub-group. Each sub-group that remains following this step should contain fewer different mutant templates than did the original group before sorting.

Steps 52, 54 and 56 are then repeated for each of the sub-groups until no more distinguishing areas are found. At this stage, all of the images in any given sub-group can be considered to constitute a single equivalence class, sharing a single template mutant. Threshold levels for identifying distinguishing areas and matching the images in a sub-group are preferably set depending on application requirements, so as to balance the level of errors that may be engendered when the thresholds are set too high (so that two non-equivalent classes may be identified as a single sub-group) against the greater processing burden that will be incurred when the thresholds are set too low (so that a single equivalence class may be divided into two).

For each equivalence class, processor 26 constructs a template, at a template extraction step 58. A preferred method for extracting a template from a group of similar images is described in U.S. patent application Ser. No. 09/566,058, which is assigned to the assignee of the present patent application and whose disclosure is incorporated herein by reference. In brief, processor 26 compares the images in the class with one another to extract a part of the images that is relatively invariant from one image to the next, i.e., to extract the Type I part of the images. This invariant part is assumed to correspond to the common template, and not to the variable information that is filled into each form. The template is preferably stored in memory 28 for use in processing additional images that may subsequently be input to system 20.

At a processing step 60, the template itself is preferably erased from each of the images in the class. Any suitable method known in the art may be used for this purpose, such as the methods described in the above-mentioned U.S. Pat. No. 5,793,887. Most preferably, the template drop-out is carried out in a manner that is designed to minimize any deleterious impact on the readability of characters filled into the template. A drop-out method of this type is described, for example, in U.S. patent application Ser. No. 09/379,244, which is assigned to the assignee of the present patent application, and whose disclosure is incorporated herein by reference. What remains of the form images at this point, following template drop-out, is the variable filled-in content, typically alphanumeric characters. This content is preferably compressed and stored in memory 28 for subsequent processing. Additionally or alternatively, OCR analysis may be applied to read the contents of the fields in each form. Other workflow mechanisms, as are known in the art, may also be applied to the sorted images.

Figure 4:
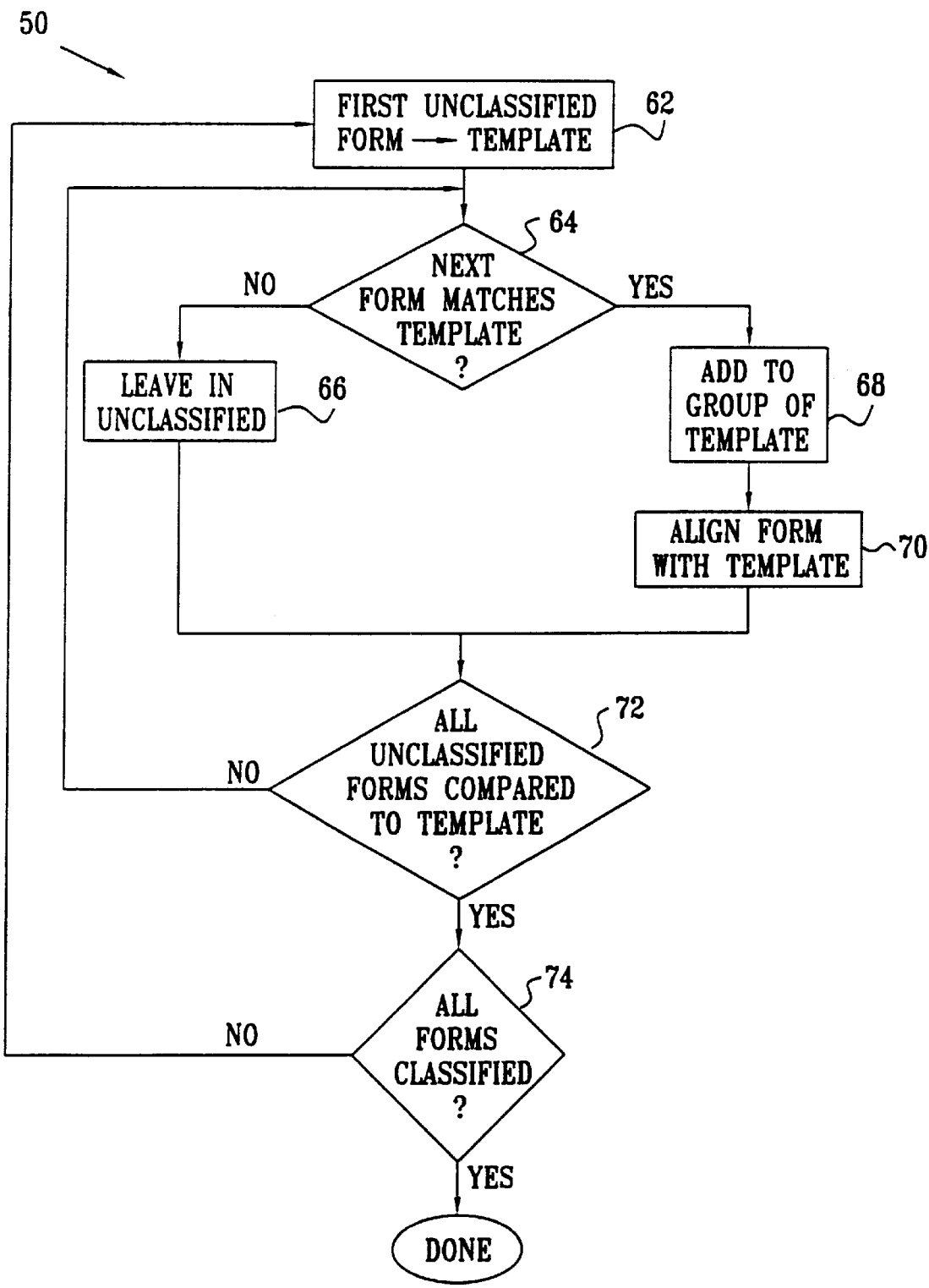
FIG. 4 is a flow chart that schematically illustrates a method for sorting form document images, in accordance with a preferred embodiment of the present invention.

FIG. 4 is a flow chart that schematically illustrates details of sorting step 50, in accordance with a preferred embodiment of the present invention. The purpose of this step, as noted above, is to form a group of similar, mutually-aligned images. The method operates on a batch of filled-in form images received by processor 26. It may be possible to classify some of the images in the batch with sufficient precision using templates that have been previously extracted or otherwise provided to system 20 and stored in memory 28. Among the unclassified images, a first form image is selected arbitrarily to serve as a template, at a template selection step 62. Features of this template form, such as lines 32 and boxes 34, are preferably chosen as recognition features, against which the other unclassified forms in the group will be matched.

At a matching step 64, the features of the next form image in the batch are compared to the template features. If the features fail to match the template to within predefined limits, the form is left in the unclassified batch, at a recognition failure step 66. If the features do match the template, however, the form is grouped with the template, at a grouping step 68. All of the form images in the group are modified to align them with the template, a: an alignment step 70. Preferably, a fine registration algorithm, as described in the above-mentioned U.S. Pat. Nos. 5,182,656 or 5,793,887, is used to achieve precise alignment of all of the images in the group, in order to facilitate subsequent processing. Any image that fails this fine registration, by requiring excessive modification to match the template, for example, may be considered to have been incorrectly classified, and is preferably returned to the unclassified group.

Step 64 et sequelae are repeated for all remaining unclassified form images in the batch, at a repetition step 72. After all of the unclassified images have been compared to the current template, and assigned to its group as appropriate, processor 26 determines whether any additional unclassified images remain, at a final classification step 74. If so, the process returns to step 62, where the next unclassified image is taken as the new template, and steps 64 through 72 are repeated until all of the images have been classified into groups.

FIG. 5 is a flow chart that schematically shows details of a method for finding a reference area in a group of images, in accordance with a preferred embodiment of the present invention. This method corresponds to steps 52 and 54 in FIG. 3. It begins with an accumulation step 80, in which an accumulation image is formed by combining all of the individual, mutually-registered form images in the group or sub-group that is being processed. Preferably, the images being processed are binary images, and the accumulation image is formed by summing the images in the group, pixel by pixel. Thus, each gray-scale pixel in the accumulation image holds a count of the number of black (foreground) pixels occurring at the location of that pixel in all of the images in the group.

The accumulation image is processed to identify the Type 1, Type 2 and Type 3 areas among the images in the group, as defined above. Preferably, the identification is based on determining an absolute threshold, T, and a contrast threshold, D, in each area, at a threshold determination step 82. These thresholds, as well as methods for calculating them, are defined in U.S. patent application Ser. No. 09/519,446 (now U.S. Pat. No. 6,351,566 issued Feb. 26, 2002), which is assigned to the assignee of the present patent application, and whose disclosure is incorporated herein by reference. A summary of a preferred method for calculation of T and D is presented in an Appendix to the present specification. The choice of sizes and numbers of the image areas to be processed in this manner is dependent on application requirements, balancing error levels against processing time, as noted above. Optionally, areas of different sizes are used at different stages of the procedure. It is typically not necessary to process all rectangles in the accumulation image. A pattern of rectangles covering the image with 50% overlap between the rectangles is generally adequate.

The absolute threshold, T, is chosen in each area so as to distinguish between the bright and dark parts of the area. In Type 1 and Type 2 areas, which are presumed to belong to the form templates, T should be relatively high, because of accumulation of pixels from the same template at the same locations in the entire group or in a large sub-group of the images. In Type 3 areas, which belong to the filled-in portion of the forms, the absolute threshold will be low, since all of the individual images have different content in these areas.

The contrast threshold, D, is chosen to reflect a minimum significant difference between neighboring pixels that indicates that a feature of the image, typically an edge, passes between the pixels. In Type 1 areas, the contrast threshold will be high, like the absolute threshold. In Type 2 areas, however, the contrast threshold will be lower, since it must distinguish between two or more different template features occurring in the area. The contrast threshold will similarly be low in Type 3 areas.

The absolute and contrast thresholds are used to find the distinguishing areas in the images, at a threshold ratio comparison step 84. Based on the analysis above, it is expected that Type 2 areas will have a significantly higher ratio of absolute threshold to contrast threshold than will Type 1 and Type 3 areas. In practice, the inventor has found the threshold ratio $T^2/D$ to give superior results, because it reduces sensitivity to error at low values of the ratio T/D. The areas having the highest threshold ratio are selected for use as the distinguishing areas. The number of distinguishing areas selected is, again, application dependent. Typically, in processing images of 1500×1000 pixels, the inventor has found that examining five candidate rectangles, each 100×100 pixels, gives good results.

In order to choose the reference area from among the distinguishing areas, each distinguishing area in the accumulation image is matched against the corresponding areas in the images in the group under consideration, at a matching step 86. The object of this step is to select one of the candidate areas in one of the images in the group that has the smallest number of black pixels that do not belong to the image template (i.e., the smallest number of black pixels that represent filled-in content) among all of the candidate areas in all of the images. The selected candidate area in the particular image can then be considered to be the one that represents the template most faithfully. It is therefore the best choice to use as the reference area. Preferably, to carry out this step, a match score is computed for each area in each of the images in the group. The score for each candidate area in each image in the group is inversely monotonic with the number of black pixels in that area of the image for which the corresponding pixel in the accumulation image has a gray-scale value that is less than the absolute threshold T determined for the area (since these pixels are assumed to belong to the fill-in part of the image). The distinguishing area that has the highest match score is chosen as the reference area, at a reference selection step 88. This is the area that is used to divide the images in the group into sub-groups at step 56, as described above.

In alternative embodiments of the present invention, not shown in detail in she figures, other methods may be used to identify and sort mutant templates. For example, alignment of the images with the form template at step 70 typically necessitates a certain amount of local distortion of the image. A small amount of distortion is normal, in order to compensate for skew in printing and scanning of the forms. When the distortion exceeds some threshold, however, it may be taken as an indication of incompatibility between the image and the template. Areas of such distortion may be used as distinguishing areas for the purpose of identifying mutants. After a sub-group of mutants has been identified, the template alignment step is preferably repeated to determine whether any further distinguishing areas remain.

As another example, after the template is dropped out of the images at step 60, only fill-in text should be left in the images. If substantial template-like features remain anywhere in the images, such as lines, boxes or large regions of black pixels, these features may also indicate incompatibility with the template. Thus, a preliminary template drop-out may be performed at the stage of step 52, and areas of the images in which template-like features remain may be used as distinguishing areas. Other methods for identifying mutants will be apparent to those skilled in the art and are considered to be within the scope of the present invention.

Although the preferred embodiments described herein relate to processing of images of form documents 24, the principles of the present invention may similarly be applied in extracting information from groups of images of other types, in which the images in a group contain a common, substantially fixed part along with individual, variable parts. In such embodiments, sub-groups of mutually-similar images are selected from the large group. A sub-group template is generated based on one or more of the images in each sub-group, and is used to "co-compress" the images in the sub-group on the basis of their differences from the template. While methods of motion image compression known in the art also determine and use image differences, such methods are based only on the differences between successive images in an image sequence, rather than seeking image similarities (among images that are not necessarily consecutive) as the basis for co-compression.

It will be thus appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

Appendix

This appendix provides details of a preferred method for calculating an optimal absolute threshold value T and contrast threshold D, based on the gray-level values of the pixels in the accumulation image, and particularly on the gaps between the gray-scale values of neighboring pixels. The values of T and D are chosen so as to increase the number of significant edges in an area of the accumulation image that would be preserved in a binarized version of the area, while decreasing the number of artifact edges that would occur.

Thus, for the purposes of the present method, we define a "significant gap" between two neighboring pixels as a gap whose absolute size is greater than D. We say that a gap is "represented" in an output binary image I(T), generated using T as the binarization threshold, if the pixels on either side of the gap have different binary values in I(T). In other words, the gap is represented if one of the pixels in the input image (i.e., the area of the accumulation image under consideration) has a gray-level value greater than T, and the other is less than T. The optimal values of T and D are then preferably found by maximizing a merit function of T and D that is chosen to meet the following criteria:

1. Correlate positively with the number of significant gaps in the input image that are represented in I(T);
2. Correlate negatively with the number of insignificant gaps in the input image that are represented in I(T); and
3. Correlate negatively with the number of significant gaps in the input image that are not represented in I(T).

To calculate such a merit function, let N(T,D) be a weighted count of insignificant gaps in the input image that are represented in I(T). Preferably, the weighting is such that the smaller the gap that is represented in I(T), the greater is its weight. In other words, each gap counted in N(T,D) has one pixel with a gray-level value greater than T, and the other pixel with a gray-level value less than T, with the absolute difference between gray-level values being no more than D. Let MAX denote the highest gray-level value in the image, so that N(T,MAX) is the weighted count of all of the gaps represented in I(T). Let G(D) be a weighted count of the number of significant gaps in the image, i.e., gaps having an absolute difference greater than D between the pixel gray-level values. The following metrics are then defined:

1. good(T,D)=N(T,MAX)−N(T,D), the weighted count of significant gaps represented in I(T);
2. artifacts(T,D)=N(T,D), insignificant gaps represented in I(T);
3. missed(T,D)=G(D)−good(T,D), significant gaps that are missed in I(T).

These metrics correspond to the three criteria listed above. The merit score of any pair (T,D) is then given by:

Score(T,D)=good(T,D)−artifacts(T,D)−missed (T,D)

The pair (T,D) that gives the highest score is chosen as the absolute threshold and contrast threshold for the area in question.

This merit score and method for choosing T and D are described above by way of example, and other scores and methods may also be used to optimize T and D. For example, the weights assigned to the gaps may be varied. Also, although "gaps" are defined herein as referring to neighboring pixels, the pixels need not be immediate neighbors, but may rather be a small distance apart. In addition, it may not be necessary to evaluate all of the gaps in the image, but rather representative samples may be taken. Furthermore, since the purpose of evaluating the gaps is primarily to choose values of T and D that will preserve true edges in the binary image, an edge operator, such as a Sobel transform, may be used to identify edges in the gray-scale image. T and D may then be optimized over the pixel gaps that correspond to these edges. Other information cues in the gray-scale image, such as V-shaped intensity profiles ("roof edges" commonly encountered in thin lines and text features), may similarly be used for this purpose. Other methods for choosing the upper and lower threshold values will be apparent to those skilled in the art.

What is claimed is:

1. A method for processing images, comprising:
   receiving a group of the images having similar characteristics, the group comprising multiple classes, such that each image belongs to one of the classes and comprises a fixed portion common to all of the images in the class to which it belongs, and a variable portion, which distinguishes the image from the other images in the class;
   evaluating a plurality of areas of the images in the group, so as to assign respective classifications to the areas that are indicative of a difference among the images in each of the areas;
   selecting one of the areas, based on the classifications, as a reference area, in which the fixed portion of the images in a first one of the classes differs consistently from the fixed portion of the images in a second one of the classes; and
   sorting the images into the classes based on the reference area.

2. A method according to claim 1, wherein receiving the group of the images comprises processing the images to determine the characteristics thereof, and selecting the images for inclusion in the group by finding a similarity in the characteristics.

3. A method according to claim 1, wherein the characteristics comprise image features recognizable by a computer, and wherein receiving the group of the images comprises mutually aligning the images in the group responsive to the features.

4. A method according to claim 3, wherein the images comprise images of form documents, and the fixed portion of the images comprises form templates, and wherein the features comprise features of the templates.

5. A method according to claim 1, wherein finding the reference area comprises finding a first reference area so as to separate a first sub-group of the images, containing the first one of the classes, from a second sub-group of the images, containing the second one of the classes, based on the first reference area, and wherein sorting the images comprises finding a further reference area in the images of the first sub-group, and sorting the images in the first sub-group based on the further reference area.

6. A method according to claim 1, wherein the images comprise images of form documents, and wherein the fixed portion comprises a form template, and the variable portion comprises characters filled into the template, and wherein sorting the images comprises grouping the documents such that all of the documents in each of the classes have substantially the same template.

7. A method according to claim 6, and comprising extracting the template from the images in one of the classes by finding a substantially invariant portion of the images in the class.

8. A method according to claim 6, and comprising processing the images so as to remove the template therefrom, while leaving the filled-in characters in the images.

9. A method according to claim 1, and comprising removing the fixed portion from the images in the first one of the classes after sorting the images, and compressing the variable portion of each of the images that remains after removal of the fixed portion.

10. A method for processing images, comprising:
    receiving a group of the images having similar characteristics, the group comprising multiple classes, such that each image belongs to one of the classes and comprises a fixed portion common to all of the images in the class to which it belongs, and a variable portion, which distinguishes the image from the other images in the class;
    finding a reference area in the images, in which the fixed portion of the images in a first one of the classes differs consistently from the fixed portion of the images in a second one of the classes; and
    sorting the images into the classes based on the reference area,
    wherein finding the reference area comprises:
       classifying a plurality of areas of the images into areas of a first type, in which substantially all of the images in the group are substantially the same, a second type, in which a sub-group of the images in the group, but not all of the images in the group, are substantially the same, and a third type, in which substantially all of the images in the group are different; and
       choosing one of the areas of the second type to use as the reference area.

11. A method according to claim 10, wherein classifying the plurality of the areas comprises combining the images in the group to generate an accumulation image, and analyzing the accumulation image to find the areas of the second type.

12. A method according to claim 11, wherein analyzing the accumulation image comprises calculating, for each of the areas in the accumulation image, an absolute threshold, indicative of a difference between bright and dark parts of the area, and a contrast threshold, indicative of a minimum significant difference between neighboring pixels in the area, and identifying as areas of the second type the areas that have a high ratio of the absolute threshold to the contrast threshold, relative to other areas of the accumulation image.

13. A method according to claim 4, wherein choosing the area of the second type to use as the reference area comprises generating a match score for each of the areas in the accumulation image by comparing the areas to corresponding areas in the images in the group, and selecting the one of the areas having the highest match score.

14. A method according to claim 10, wherein sorting the images comprises selecting one of the images in the sub-group as a base image and removing from the sub-group the images in the group that differ in the reference area from the base image, and repeating over the images in the sub-group the steps of classifying the plurality of the areas and choosing one of the areas of the second type so as to find a new reference area, and sorting the images in the sub-group based on the new reference area.

15. A method according to claim 14, wherein the steps of classifying the plurality of the areas, choosing one of the areas of the second type, and removing the images from the sub-group are repeated until substantially no remaining areas of the second type are found in the sub-group of the sorted images.

16. A method according to claim 10, wherein the images comprise images of form documents, and wherein the fixed portion comprises a form template, and wherein the areas of the second type comprise areas in which the template of the images in the sub-group differs from the template of the images that are not in the sub-group.

17. Apparatus for processing images, comprising an image processor, which is arranged to receive a group of the images having similar characteristics, the group comprising multiple classes, such that each image belongs to one of the classes and comprises a fixed portion common to all of the images in the class to which it belongs, and a variable portion, which distinguishes the image from the other images in the class,
the image processor being further arranged to evaluate a plurality of areas of the images in the group, so as to assign respective classifications to the areas that are indicative of a difference among the images in each of the areas, and to select one of the areas, based on the classifications, as a reference area, in which the fixed portion of the images in a first one of the classes differs consistently from the fixed portion of the images in a second one of the classes, and to sort the images into the classes based on the reference area.

18. Apparatus according to claim 17, wherein the processor is arranged to process the images so as to determine the characteristics thereof, and to select the images for inclusion in the group by finding a similarity in the characteristics.

19. Apparatus according to claim 17, wherein the characteristics comprise image features recognizable by a computer, and wherein the processor is arranged to align the images in the group with one another responsive to the features.

20. Apparatus according to claim 19, wherein the images comprise images of form documents, and the fixed portion of the images comprises form templates, and wherein the features comprise features of the templates.

21. Apparatus according to claim 17, wherein the processor is arranged to find a first reference area so as to separate a first sub-group of the images, containing the first one of the classes, from a second sub-group of the images, containing the second one of the classes, based on the first reference area, and to find a further reference area in the images of the first sub-group, and to sort the images in the first sub-group based on the further reference area.

22. Apparatus according to claim 17, wherein the images comprise images of form documents, and wherein the fixed portion comprises a form template, and the variable portion comprises characters filled into the template, and wherein the processor is arranged to sort the documents such that all of the documents in each of the classes have substantially the same template.

23. Apparatus according to claim 22, and where the processor is arranged to extract the template from the images in one of the classes by finding a substantially invariant portion of the images in the class.

24. Apparatus according to claim 22, wherein the processor is arranged to process the images so as to remove the template therefrom, while leaving the filled-in characters in the images.

25. Apparatus according to claim 17, wherein the processor is arranged to remove the fixed portion from the images in the first one of the classes after sorting the images, and to compress the variable portion of each of the images that remains after removal of the fixed portion.

26. Apparatus for processing images, comprising an image processor, which is arranged to receive a group of the images having similar characteristics, the group comprising multiple classes, such that each image belongs to one of the classes and comprises a fixed portion common to all of the images in the class to which it belongs, and a variable portion, which distinguishes the image from the other images in the class, and to find a reference area in the images, in which the fixed portion of the images in a first one of the classes differs consistently from the fixed portion of the images in a second one of the classes, and to sort the images into the classes based on the reference area,
wherein in order to find the reference area, the processor is arranged to classify a plurality of areas of the images into areas of a first type, in which substantially all of the images in the group are substantially the same, a second type, in which a sub-group of the images in the group, but not all of the images in the group, are substantially the same, and a third type, in which substantially all of the images in the group are different, and to choose one of the areas of the second type to use as the reference area.

27. Apparatus according to claim 26, wherein the processor is arranged to combine the images in the group to generate an accumulation image, and to analyze the accumulation image to find the areas of the second type.

28. Apparatus according to claim 27, wherein the processor is arranged to calculate, for each of the areas in the accumulation image, an absolute threshold, indicative of a difference between bright and dark parts of the area, and a contrast threshold, indicative of a minimum significant difference between neighboring pixels in the area, and to identify as areas of the second type the areas that have a high ratio of the absolute threshold to the contrast threshold, relative to other areas of the accumulation image.

29. Apparatus according to claim 26, wherein the processor is arranged to generate a match score for each of the areas in the accumulation image by comparing the areas to corresponding areas in the images in the group, and to select as the reference area the one of the areas having the highest match score.

30. Apparatus according to claim 26, wherein the processor is arranged to select one of the images in the sub-group as a base image and to remove from the sub-group the images in the group that differ in the reference area from the base image, and to repeat over the images in the sub-group steps of classifying the plurality of the areas and choosing one of the areas of the second type so as to find a new reference area, and to sort the images in the sub-group based on the new reference area.

31. Apparatus according to claim 30, wherein the processor is arranged to repeat the steps of classifying the plurality of the areas, choosing one of the areas of the second type, and removing the images from the sub-group until substantially no remaining areas of the second type are found in the sub-group of the sorted images.

32. Apparatus according to claim 26, wherein the images comprise images of form documents, and wherein the fixed portion comprises a form template, and wherein the areas of the second type comprise areas in which the template of the images in the sub-group differs from the template of the images that are not in the sub-group.

33. A computer software product, comprising a computer-readable medium in which program instructions are stored, which instructions, when read by a computer, cause the computer to receive a group of images having similar characteristics, the group comprising multiple classes, such that each image belongs to one of the classes and comprises a fixed portion common to all of the images in the class to which it belongs, and a variable portion, which distinguishes the image from the other images in the class, wherein the instructions further cause the computer to evaluate a plurality of areas of the images in the group, so as to assign respective classifications to the areas that are indicative of a difference among the images in each of the areas, and to select one of the areas, based on the classifications, as a reference area, in which the fixed portion of the images in a first one of the classes differs consistently from the fixed portion of the images in a second one of the classes, and to sort the images into the classes based on the reference area.

34. A computer software product, comprising a computer-readable medium in which program instructions are stored, which instructions, when read by a computer, cause the computer to receive a group of images having similar characteristics, the group comprising multiple classes, such that each image belongs to one of the classes and comprises a fixed portion common to all of the images in the class to which it belongs, and a variable portion, which distinguishes the image from the other images in the class, and to find a reference area in the images, in which the fixed portion of the images in a first one of the classes differs consistently from the fixed portion of the images in a second one of the classes, and to sort the images into the classes based on the reference area, wherein the instructions cause the computer, in order to find the reference area, to classify a plurality of areas of the images into areas of a first type, in which substantially all of the images in the group are substantially the same, a second type, in which a sub-group of the images in the group, but not all of the images in the group, are substantially the same, and a third type, in which substantially all of the images in the group are different, and to choose one of the areas of the second type to use as the reference area.

* * * * *